Aug. 20, 1957  P. MESHBERG  2,803,375
NESTABLE VESSELS
Filed April 12, 1954
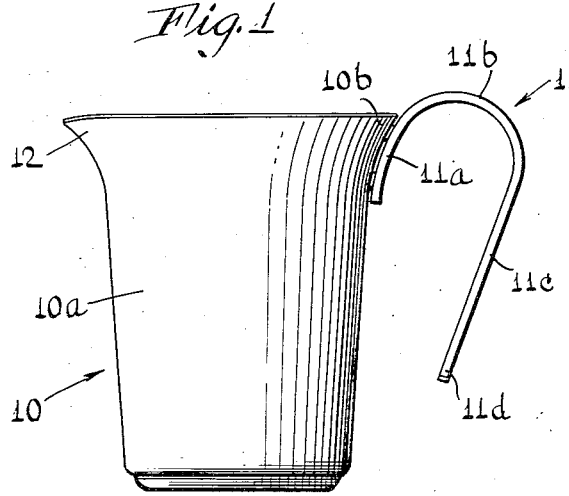
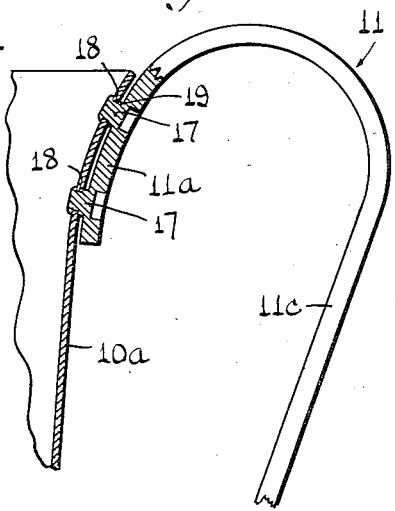
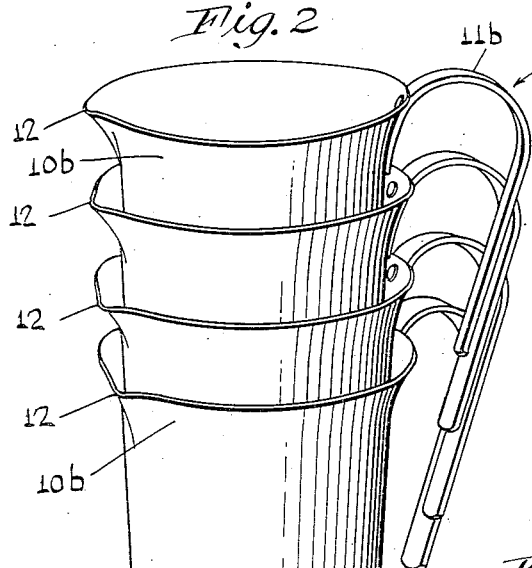
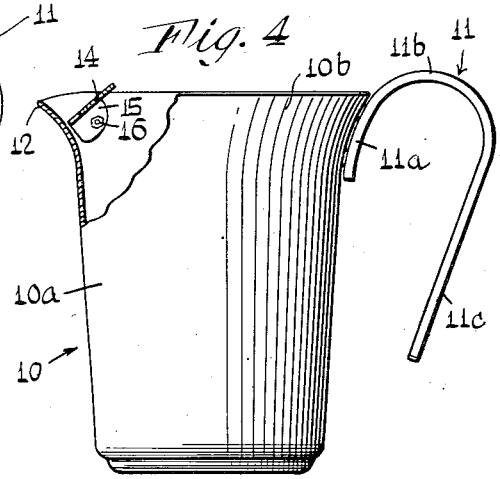
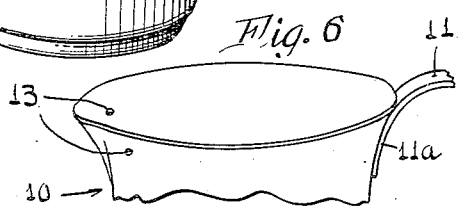
INVENTOR.
Philip Meshberg
BY
Johnson and Kline
ATTORNEYS United States Patent Office 2,803,375
Patented Aug. 20, 1957

2,803,375

NESTABLE VESSELS

Philip Meshberg, Fairfield, Conn.

Application April 12, 1954, Serial No. 422,343

4 Claims. (Cl. 220—94)

The present invention relates to vessels and more particularly to pitchers adapted to be nested.

Heretofore, in displaying and/or storing a plurality of pitchers or the like vessels, it has been necessary to take up large amounts of counter space inasmuch as it was inconvenient to nest them.

The present invention overcomes these difficulties by providing a vessel or pitcher of simple construction which is capable of fitting one within the other so as to nest the same whereby a plurality of vessels or pitchers can be displayed and/or stored in a minimum of space.

This is accomplished, according to the present invention, by providing a tapered body portion adapted to be partially inserted into another similar body portion and providing each with a handle secured to the projecting portion of the body and shaped to extend away from the body and downwardly along the body in spaced relation thereto so as to provide a gripping portion, the gripping portion having a free lower end and being spaced from the body portion so that the pitchers can be readily nested with other pitchers without interference by the handle.

The vessel of the present invention is preferably made of metal such as aluminum and formed of two parts of simple construction whereby the cost of manufacture and assembly thereof is greatly reduced. When made of aluminum they are lightweight and can, by anodizing, be provided in attractive colors.

A feature of the invention resides in the novel cooperating means on the handle and pitcher for properly positioning the handle on the pitcher and securing it thereto.

Other features and advantages of the invention will be apparent from the specification and claims when considered in connection with the drawings in which:

Figure 1 shows a side view of the vessel or pitcher.

Fig. 2 shows a side view of a plurality of pitchers in nested relation.

Fig. 3 shows a fragmentary view, partly in section, of the handle mounting means.

Fig. 4 shows a pitcher with an ice guard mounted therein.

Fig. 5 shows a perspective view of the ice guard.

Fig. 6 is a fragmentary perspective view of the pitcher of Fig. 4.

While the present invention may be applied to vessels of various shapes it is herein illustrated as a pitcher having a hollow body 10 provided with tapered symmetrical wall portions 10a adapted to be partially inserted into another similar pitcher in nested relation as shown in Fig. 2. While the body may be formed by casting or molding the same of suitable material, it is herein preferred to draw or spin it from sheet metal.

As shown in the drawings, a handle 11 is secured to the upper portion 10b of the pitcher which is located above tapered portion 10a and adapted to project above the lower pitcher when in nested relation as shown in Fig. 2. In the preferred form of the invention, the handle comprises a strip of metal and is shaped to have a securing section 11a at one end adapted to be positioned adjacent the projecting portion of the body and be secured thereto, and has an outwardly extending portion 11b connected to the securing portion and then a gripping portion 11c which extends downwardly along the sides of the vessel in spaced relation thereto and terminating in a free end 11d located away from the body. With this construction it will be seen that, while the handle provides adequate support for holding the pitcher during the manipulation thereof, it does not in any way interfere with the nesting of the pitchers as shown in Fig. 2.

A pouring lip 12 can be provided and this is preferably located entirely in the projecting upper body portion 10b of the pitcher.

If desired, an ice guard or strainer to retain ice in the pitcher may be provided for the pitcher. In the preferred form of the invention, this is accomplished by providing holes 13 in the body on each side of the pouring spout and securing an ice guard 14 having fastening wings 15 in position therein by means of bolts 16 or the like passing through the holes 13 and wings 15. This guard which is readily detachable can be shipped separately so that it does not interfere with the nesting of the containers in shipment and in storage and can be readily attached by the merchant or customer.

In the present preferred form of the invention, the handle is secured to the body by having portions of the securing section displaced outwardly to provide lugs 17 which are adapted to pass through holes 18 in the projecting upper portion of the body, and then headed over, as shown in Fig. 3, into engagement with the inner surface of the body to secure the handle thereto.

Under some conditions it may be desired to secure the securing section of the handle in slightly spaced relation to the wall structure so that it will permit complete draining of the vessel when washed and also which provides a minimum of contact between the handle and the vessel so that heat transfer is retarded. While the spacing of the securing section from the wall of the vessel may be provided in many ways, as, for example, by having a portion of the wall projecting toward the handle, it is herein illustrated as accomplished by having the displaced lugs 17 formed with shoulders 19 which are adapted to engage the outer surface of the wall, as shown in Fig. 3, and locate the handle in proper position.

The present invention lends itself to economical manufacture, particularly of aluminum, since the body portion can be readily spun and shaped to the desired configuration and the handle may be readily stamped and formed from strip aluminum and thus provide a lightweight vessel. Further, inasmuch as separate fastener or securing means are not required, the pitcher can be readily and easily assembled.

Another advantage of the aluminum construction resides in the fact that it can be readily anodized to provide attractive colors on the surface of the aluminum. In this connection, the securing of the handle to the body with its securing section in slightly spaced relation to the body permits a thorough washing of the acid utilized during the anodizing process so that it will be completely removed and will not stain or injure the color produced during the anodizing process.

Variations and modifications may be made within the scope of the claims and portions of the improvements may be used without others.

I claim:

1. A nestable pitcher comprising a hollow body having tapered side walls and adapted to be partially inserted into another similar pitcher and having holes in the portion adapted to project above said other pitcher; and a handle adapted to be secured only to the projecting portion of the body, said handle having a securing section provided with integral lugs having shoulders to engage the outer surface of the side walls and space the securing section therefrom, said lugs including projecting portions adapted to extend beyond the shoulders and through the holes in the side wall and be headed over into engagement with the inner walls thereof to secure the handle thereto, said handle having an outwardly extended portion connected to said securing section and a downwardly extending gripping portion connected to said outwardly extending portion and having a free end, said downwardly extending portion extending along the body in spaced relation thereto and adapted to overlie the outer surface of the other pitcher without interfering with the nesting thereof.

2. A nestable pitcher comprising a hollow aluminum body having tapered side walls and adapted to be partially inserted into a similar pitcher and having holes in the portion adapted to project above said other pitcher; and a handle comprising a strip of aluminum adapted to be secured only to the projecting portion of the body, said handle being provided with a securing section having portions thereof displaced to form integral lugs having shoulders to engage the outer surface of the side walls and space the securing section therefrom, said lugs including portions projecting beyond the shoulders and adapted to extend through the holes in the side wall and be headed over into engagement with the inner walls thereof, said handle having an outwardly extended portion connected to said securing section and a downwardly extending portion connected to said outwardly extending portion and having a free end, said downwardly extending portion extending along the body in spaced relation thereto and adapted to overlie the outer surface of the other pitcher without interfering with the nesting thereof.

3. The invention as defined in claim 2 wherein the body and handle are provided with an anodized surface.

4. A hollow vessel comprising a hollow body having side walls provided with spaced holes on one side thereof; and a handle adapted to be secured to said side wall to overlie the outer surface thereof, said handle having a securing section provided with integral lugs having shoulders to engage the outer surface of the side walls and space the securing section therefrom, said lugs including projecting portions adapted to extend beyond the shoulders and through the holes in the side wall and be headed over into engagement with the inner walls thereof to secure the handle thereto.

References Cited in the file of this patent

UNITED STATES PATENTS

| | | |
|---|---|---|
| 200,686 | Berry | Feb. 26, 1878 |
| 227,426 | Grundy | May 11, 1880 |
| 265,126 | Miller | Sept. 26, 1882 |
| 279,989 | Steinhorst | June 26, 1883 |
| 295,930 | Marr | Apr. 1, 1884 |
| 304,948 | Milligan et al. | Sept. 9, 1884 |
| 483,798 | Thoeni | Oct. 4, 1892 |
| 816,858 | Ham | Apr. 3, 1906 |
| 964,554 | Reuter et al. | July 19, 1910 |
| 979,847 | Hammond | Dec. 27, 1910 |
| 1,163,211 | Chandler | Dec. 7, 1915 |
| 1,221,639 | Walsh | Apr. 3, 1917 |
| 1,546,131 | Hechler | July 14, 1925 |
| 1,901,705 | De Vout et al. | Mar. 14, 1933 |
| 1,959,857 | Davis | May 22, 1934 |
| 2,201,067 | Whitmer | May 14, 1940 |
| 2,239,093 | Giller | Apr. 22, 1941 |
| 2,271,822 | Hills | Feb. 3, 1942 |
| 2,412,178 | Seigh | Dec. 3, 1946 |
| 2,530,124 | Kieckhefer | Nov. 14, 1950 |
| 2,552,806 | Nelson | May 15, 1951 |
| 2,564,834 | Devine et al. | Aug. 21, 1951 |
| 2,649,967 | Tyson | Aug. 25, 1953 |

FOREIGN PATENTS

| | | |
|---|---|---|
| 136,898 | Great Britain | Dec. 22, 1919 |
| 546,921 | France | Sept. 6, 1922 |
| 401,073 | Great Britain | Nov. 9, 1933 |
| 776,414 | France | Oct. 31, 1934 |